United States Patent [19]

Theiss et al.

[11] Patent Number: 4,565,920
[45] Date of Patent: Jan. 21, 1986

[54] FAIL SAFE THERMAL CONTROL DEVICE

[75] Inventors: John J. Theiss, St. Louis, Mo.; Paul T. Durst, Louisville, Ky.

[73] Assignee: Temp. Systems, Inc., St. Louis, Mo.

[21] Appl. No.: 610,035

[22] Filed: May 14, 1984

[51] Int. Cl.⁴ ............................................. H05B 1/02
[52] U.S. Cl. ..................................... 219/513; 219/510; 219/491; 219/494; 337/309; 337/306; 337/321; 200/83 B
[58] Field of Search ............... 219/513, 507, 508, 509, 219/494, 510, 490, 491; 337/309–311, 321, 306; 200/81.5, 81.8, 83 B

[56] References Cited

U.S. PATENT DOCUMENTS

| | | | |
|---|---|---|---|
| 2,889,432 | 6/1959 | Miller | 337/310 |
| 3,465,112 | 9/1969 | Reichert et al. | 200/83 B |
| 3,784,772 | 1/1974 | Nelson | 200/83 B |
| 3,882,439 | 5/1975 | Wolfe | 337/321 |

*Primary Examiner*—M. H. Paschall
*Attorney, Agent, or Firm*—Edward R. Weber

[57] ABSTRACT

This invention relates generally to thermal control apparatus wherein a change in temperature is transmitted from a sensing bulb through a capillary to a control device. More particularly this invention is related to a novel, fail-safe control device for use in conjunction with a temperature sensing bulb, capillary, and control device in an oven or other heating facility whereby a loss of pressure within the bulb, capillary, control device system will cause the heating device to be shut off and thus will prevent the oven or other heating facility from being overheated.

6 Claims, 4 Drawing Figures

FAIL SAFE THERMAL CONTROL DEVICE

This invention relates generally to control apparatus wherein a change in temperature is transmitted from a sensing bulb through a capillary to a control device. More particularly this invention is related to a novel, fail safe device for use in conjunction with a temperature sensing bulb, capillary, and control device in an oven or other heating facility.

Conventional thermostatic control devices used in home ovens and other heating devices typically have a controller consisting of a bulb located within the heated area, a bellows or other operator located outside the heated area, and a capillary connecting the bulb and the operator. The entire system, bulb, capillary, and operator, is filled with a thermally responsive compound so that as the bulb is exposed to heat, the compound expands and thus moves the bellows or operator. Temperature control within the oven is obtained by linking the operator to a switch or valve so that the source of heat to the oven is turned off when the operator has moved a predetermined amount. The system works very well as long as the bulb, capillary, and bellows or other operator remains pressure-tight, so that an increase in the volume of the compound results in movement of the operator. However, frequently a leak will develop in the system with the result that the compound is permitted to leak out. When this occurs, an increase in heat in the area of the bulb does not cause a change in the position of the operator. There is thus no control to terminate the source of heat and a severe overheat situation may result. In extreme cases, this may cause a fire or, at a minimum, may cause the burning of whatever material is contained within the oven.

The instant invention is a device which will disconnect the source of heat when a loss of pressure within the bulb, capillary, operator system occurs. Thus the system, when it fails, will be rendered safe and will not create a fire hazard.

In the instant application,

Figure 1:
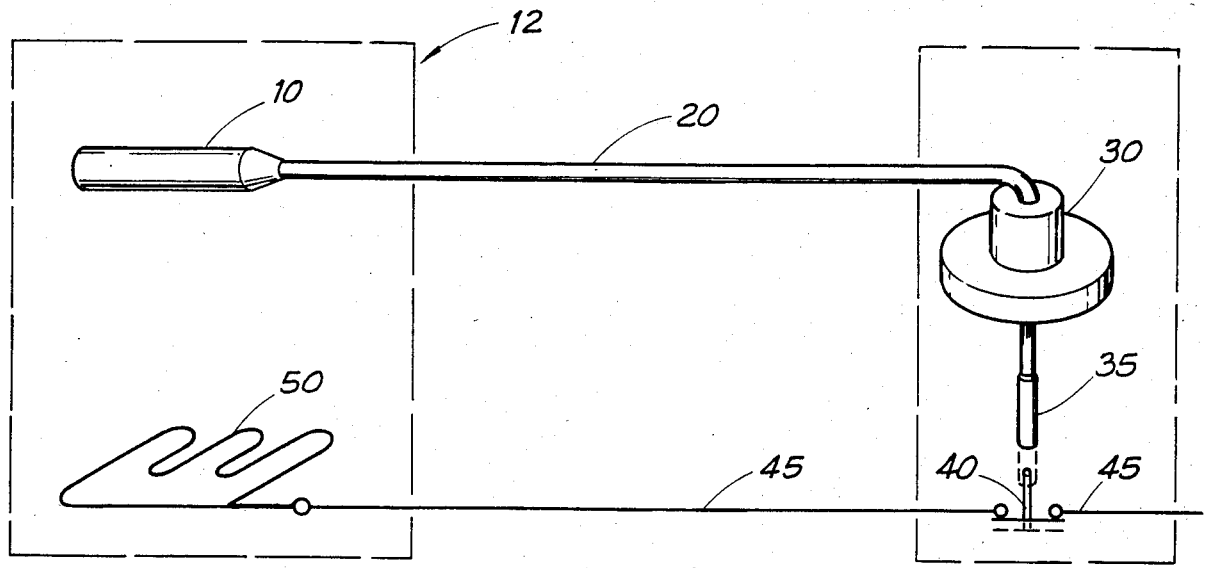
FIG. 1 represents a schematic of a typical control system used to control the temperature of an electrically heated oven.

In FIG. 1, temperature sensing bulb 10 is located within the oven 12 or other area for which the temperature is to be controlled. Capillary 20 connects bulb 10 with operator 30, which operator in turn operates switch 40 through linkage 35. Switch 40 controls the electrical current flowing through line 45 to heating element 50. During normal operation, operator 30 and linkage 35 are calibrated so that switch 40, normally closed, will be opened when the temperature surrounding bulb 10 reaches a predetermined level. This is accomplished by constructing bulb 10 and capillary 20 so that they are essentially nonelastic. In contrast to this, operator 30 is fabricated so that it is substantially elastic and can change in size when the volume of compound inside it changes. The entire assembly of bulb 10, capillary 20, and operator 30 is filled with a thermally responsive compound whose volume increases with increases in temperature. Thus, an increase in temperature surrounding bulb 10 will cause the compound contained in bulb 10 to expand. Since bulb 10 is essentially nonelastic, the increase in volume of compound is transmitted through nonelastic capillary 20 to elastic operator 30, which increase in volume causes a change in the size of operator 30. When a predetermined change in size has occurred, linkage 35 opens switch 40 cutting off the electricity to heating element 50. It is thus seen that a periodic cycling of switch 40 will serve to control the current through heating element 50 and, in turn, control the temperature of the space containing heating element 50 and bulb 10. As has been previously pointed out, however, a leak in either bulb 10, capillary 20, or operator 30 results in a failure of the system, so that an increase in the temperature surrounding bulb 10 does not result in the opening of switch 40. The heating elements thus are permitted to be constantly on and the control function is totally eliminated with occasionally disastrous results.

Figure 2:
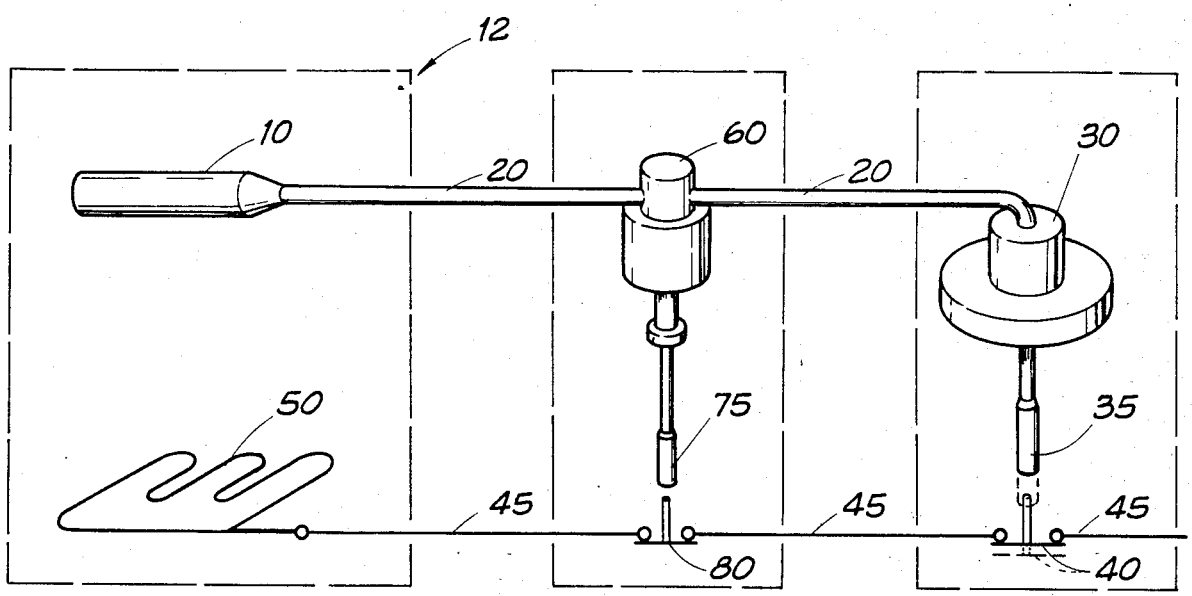
FIG. 2 represents the system as disclosed in FIG. 1 wherein the safety device of the instant invention has been incorporated into the system.

In FIG. 2, safety device 60, linkage 75, and switch 80 have been inserted in the system. Safety device 60, the subject of the instant invention, is linked to switch 80 in such a fashion that a loss of pressure in capillary 20 results in linkage 75 opening switch 80 and thus disconnecting electrical current from heating element 50. This way the system is fail safe, as any leakage in the control system will cause safety switch 80 to open. Thus, instead of having a runaway temperature condition, the heating element will be rendered inactive and the system will cool off and be rendered safe.

Figure 3:
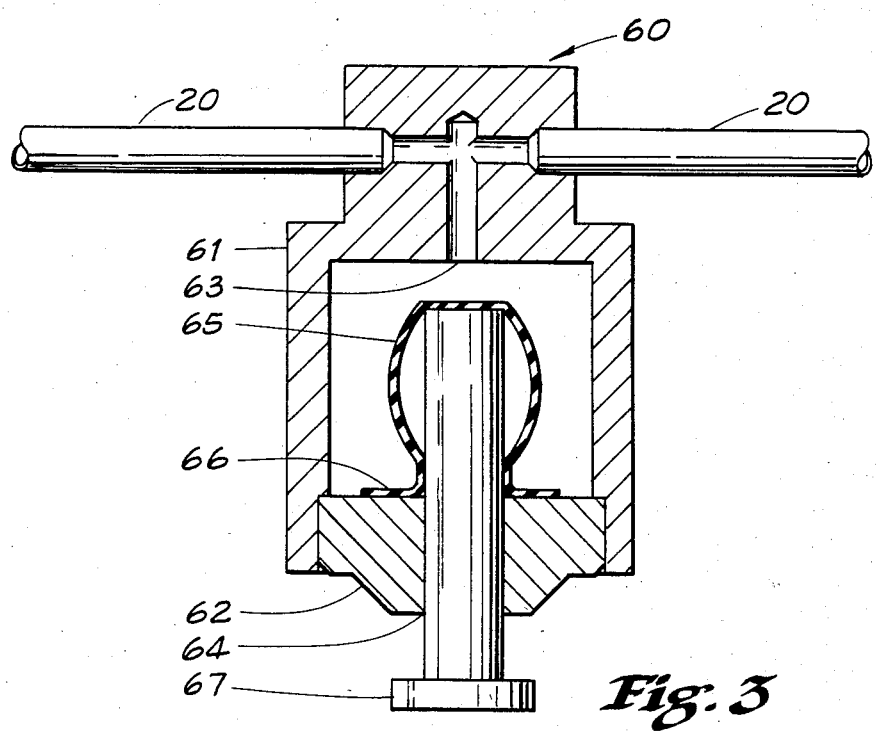
FIG. 3 is a cross-sectional view of a version of the safety device.

FIG. 3 presents a cross-sectional view of safety device 60. Safety device 60 consists of: a rigid chamber 61 having a closure 62, so that chamber 61 and closure 62 create a pressure containing chamber; a port 63 connected to capillary 20; a hole 64 in closure 62; a hollow, resilient ellipsoid 65 affixed to the interior of closure 62 by flange 66; and a member 67 which transmits the longitudinal movement of the end of ellipsoid 65 to the exterior of control 60. Hollow ellipsoid 65 is so designed that an increase in pressure in pressure chamber 61 causes the ellipsoid to elongate. Conversely, a decrease in pressure will permit the ellipsoid to assume a more nearly spherical configuration. As has been previously mentioned in the description of FIG. 2, this change is communicated to switch 80 through member 67 and linkage 75. When installed, the system is calibrated so that the pressure in the system is sufficient to maintain ellipsoid 65 in its elongated state at ambient temperatures. In this at rest condition, the volume of the system is such that switch 80 is closed, as is switch 40. As the temperature in the oven increases, bulb 10 is heated and the compound expands and is transmitted through capillary 20 to operator 30. When a certain degree of expansion has occurred, switch 40 opens. Ellipsoid 65 and safety control 60 are held in the elongated state by this nominal increase in pressure and switch 80 will remain closed regardless of the increase in volume. It is only when a leak in the system occurs that the pressure in chamber 61 decreases to the point that ellipsoid 65 is permitted to assume its more spherical shape, thus shortening its major axis, causing member 67 to be forced out of chamber 61, which in turn operates linkage 75 which opens switch 80.

Referring back to FIG. 3, it will be seen that an increase in the volume of compound contained within chamber 61 will result in a decrease in the interior volume of hollow ellipsoid 65. Such a decrease is accomplished by distorting hollow ellipsoid 65 into a more nearly cylindrical configuration. This more cylindrical configuration will result in a lengthening of the major axis of ellipsoid 65 and change the position of member 67. In use, the basic pressure in chamber 61 is such that ellipsoid 65 is maintained in the elongated configuration. Ellipsoid 65 only returns to its non-distorted, more spherical configuration when the pressure in chamber 61 is reduced, such as would happen when there is a leak in the system.

Figure 4:
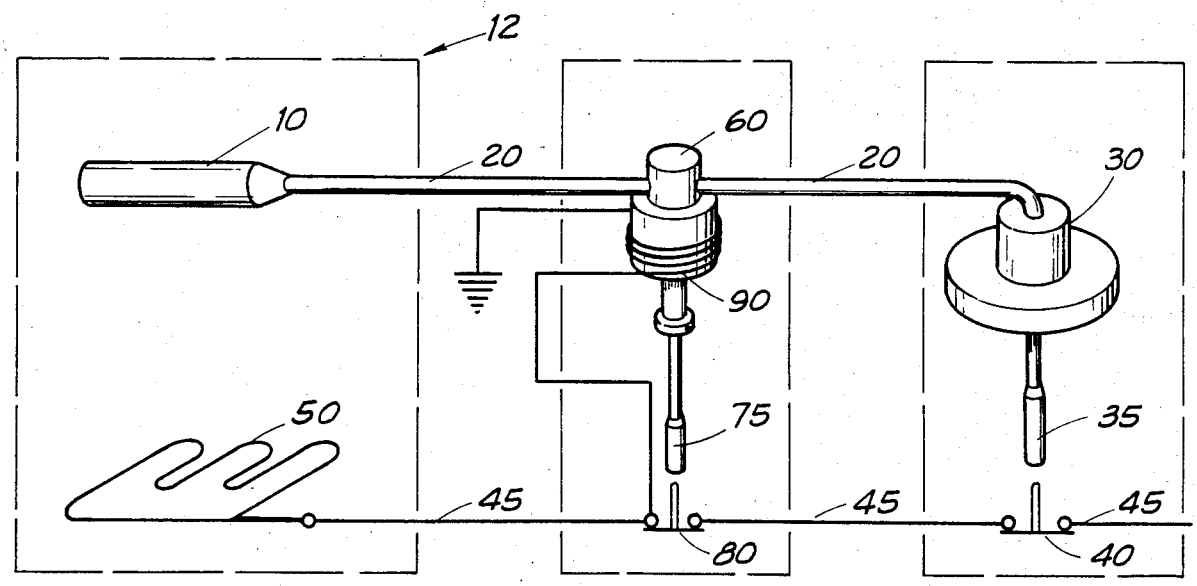
FIG. 4 is a modification of the system shown in FIG. 2.

In FIG. 4, a modification of the system in FIG. 2 is shown. In this modification, auxiliary heating element 90 is affixed to safety device 60 and connected to the controlled side of switch 80. In this system, when current is flowing to heating element 50, current is also flowing to auxiliary heating element 90. This heating element serves to heat the thermally responsive compound contained in pressure chamber 61. The increase in volume produced by this heat is communicated to capillary 20 and results in increased movement of operator 30. This auxiliary heating element will reduce the amplitude of thermal variation and will result in a more uniform temperature control in the oven.

In view of the above, it will be seen that the objects of the invention are achieved and other advantageous results are obtained. As various changes can be made in the above constructions without departing from the scope of the invention, it is intended that all matter contained in the above description or shown in the accompanying drawings shall be interpreted as illustrative and not in a limiting sense.

What is claimed is:

1. A pressure responsive mechanism consisting of:
   (a) a pressure containing chamber;
   (b) a hollow, resilient ellipsoid having a major axis mounted in said chamber;
   (c) means for varying the pressure within said chamber so that the major axis of the ellipsoid increases in length when the chamber pressure is increased and decreases in length when the chamber pressure is reduced; and
   (d) means for communicating the variation in length of said major axis to the exterior of the pressure containing chamber.

2. In a temperature control system consisting of a non-elastic container adapted to be subject to temperature changes, a capillary tube connected to said container and extending to a pressure responsive device, an expansible and contractable compound filling said container, said tube, and said pressure responsive device, and a linkage connecting said pressure responsive device to a control device whereby changes in the pressure responsive device, resulting from expansion or contraction of the expansible/contractable compound, open or close the control device so as to regulate, when a primary heating device is supplying heat, the improvement wherein a pressure responsive mechanism, consisting of (a) a pressure containing chamber; (b) a hollow, resilient ellipsoid having a major axis mounted in said chamber so that the major axis of the ellipsoid increases in length when the chamber pressure is increased and decreases in length when the chamber pressure is reduced; and (c) means for communicating the variation in length of said major axis to the exterior of the pressure containing chamber is interconnected with the expansible-contractable compound-filled capillary tube in such a fashion that failure of the expansible/contractable compound to completely fill the bulb, capillary, pressure responsive device, and pressure responsive mechanism will permit the major axis of the ellipsoid of the pressure responsive mechanism to decrease in length, which decrease in length is communicated by a second linkage to a second control device, which control device, when activated by the decrease in length of the major axis of the ellipsoid, prevents the primary heating device from supplying heat.

3. The mechanism of claim 2 wherein the primary heating device is an electrical heating element and the first and second control devices are switches controlling the flow of electric current to the electrical heating element.

4. The mechanism of claim 2 wherein the second pressure responsive mechanism is provided with an auxiliary heating element, which auxiliary heating element provides heat whenever the primary heating device is supplying heat and does not provide heat when the primary heating device is not supplying heat.

5. The mechanism of claim 4 wherein the auxiliary heating element is an electrical heating element.

6. The mechanism of claim 4 wherein the primary heating device is an electrical heating element and the first and second control devices are switches controlling the flow of electric current to the electrical heating element.

* * * * *